W. H. SEIDENSTRICKER.
Apparatus for Making Confectionary.
No. 138,587. Patented May 6, 1873.
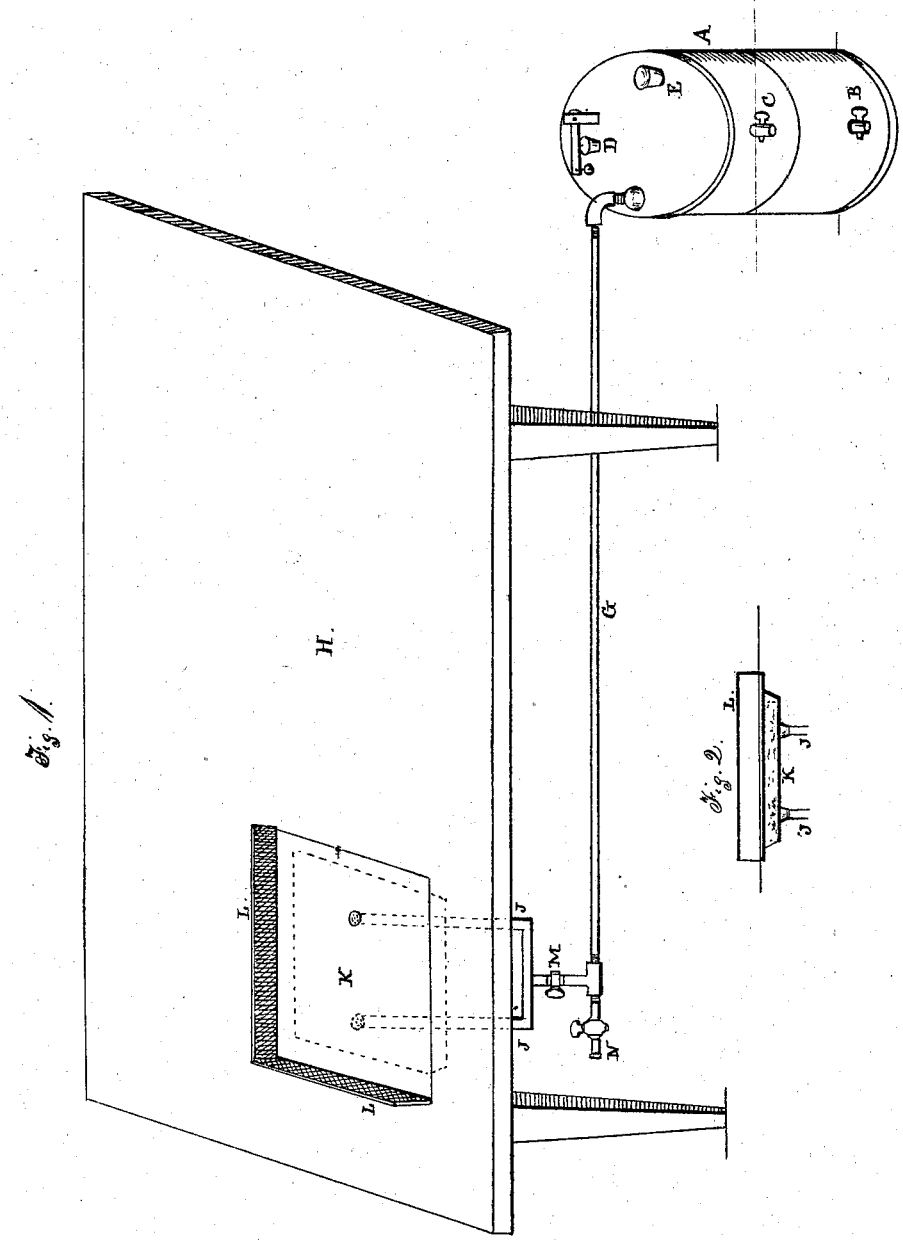

UNITED STATES PATENT OFFICE.

WILLIAM H. SEIDENSTRICKER, OF HAGERSTOWN, MARYLAND.

IMPROVEMENT IN APPARATUS FOR MAKING CONFECTIONERY.

Specification forming part of Letters Patent No. 138,587, dated May 6, 1873; application filed November 21, 1872.

*To all whom it may concern:*

Be it known that I, WILLIAM H. SEIDENSTRICKER, of Hagerstown, Washington county, State of Maryland, have invented a new and useful Portable Apparatus for Manufacturing Stick-Candy by Steam or Heat; and I do hereby declare the following to be an exact description thereof, reference being had to the accompanying drawing and to the letters of reference marked thereon making a part of this specification, in which—

Figure 1 represents a perspective view of the boiler, pipes, steam-chamber, and working-table composing the apparatus. Fig. 2 represents a side view of the heater or steam-chamber.

The nature of my invention consists in the combination of the boiler, connecting-pipes, and steam-chamber with the working-table. The object of my invention is to apply a regular heat to a batch of candy, to facilitate the manufacturing of stick-candy, and to prevent the batch from getting too sticky or soft or too hard or brittle during the working of the batch, and to lessen the cost of manufacture by the use of a cheap and portable apparatus.

I make a simple and cheap sheet-metal boiler, A, to hold about two gallons of water, and put into the boiler about six quarts of water, allowing two quarts for steam. The lower pipe or cock B is for waste water. The upper pipe C is intended for safety-valve; also, a safety-valve, D, is on the top of the boiler. E is the supply-pipe. The steam or hot-air pipe G is extended from the boiler A under the table H until its connection with the double pipes J J, that convey the steam into the steam-chamber K. The top plate of the steam-chamber K is located level with the top of the working-table H, and is made of heavy copper, so as to contain the heat of the steam-chamber, that may be made of cheaper and lighter metal. The batch of candy is worked upon a piece of canvas cloth, that is laid upon the top of the copper-plate of the steam-chamber K, which prevents the candy from sticking to the copper plate, and the raised sides or flanges L L (at the left and back side of the plate) prevent the batch from rolling off while being worked with the hand, and, as the batch of candy is thus regularly and properly heated, it is easily drawn out into long sticks, and relieves the workman from being overheated, as heretofore, over a hot furnace, and also prevents the candy from being scorched and burned, and the heat or steam of the steam-chamber K always gives a regular heat to the candy so as to be worked with superior results, and with much greater facility, than when held over and heated by a furnace, as usual. As the boiler can be heated by any ordinary stove, much fuel is saved, and the heat of the steam-chamber K is easily and quickly regulated by the cock M. N represents a pipe or cock intended as a discharge-pipe, when required.

What I claim as my invention, and desire to secure by Letters Patent, is—

The combination of the boiler A, connecting steam or hot-air pipes G and J J, and steam-chamber K, when constructed and arranged as herein described, and for the purposes set forth.

WILLIAM H. SEIDENSTRICKER.

Witnesses:
J. FRANKLIN REIGART,
EDM. F. BROWN.